(No Model.)
T. B. WELLMAN.
CARBURETING COMPOUND.
No. 411,912. Patented Oct. 1, 1889.
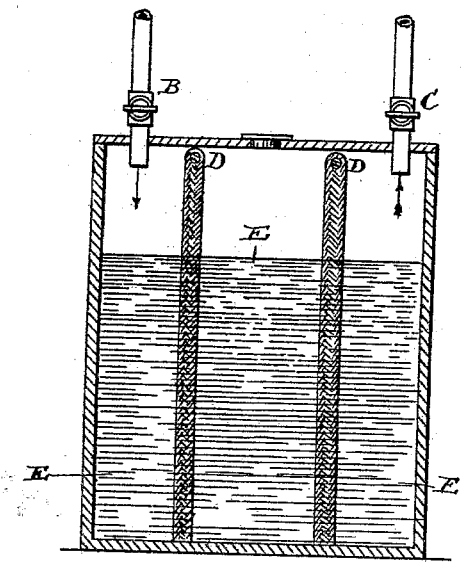
Witnesses
Ira R. Steward
S. Smith
Inventor
Timothy B. Wellman
By his Attorney
W. W. Canfield

United States Patent Office.

TIMOTHY B. WELLMAN, OF NEW YORK, N. Y.

CARBURETING COMPOUND.

SPECIFICATION forming part of Letters Patent No. 411,912, dated October 1, 1889.

Application filed May 3, 1889. Serial No. 309,488. (No specimens.)

*To all whom it may concern:*

Be it known that I, TIMOTHY B. WELLMAN, a citizen of the United States, and a resident of New York, in the county of New York and State of New York, have invented certain new and useful Improvements in Carbureting Compounds, of which the following is a specification.

It is well known that illuminating-gas which has been enriched by hydrocarbon vapors is liable to become partially decomposed in passing through cold tubes or pipes for considerable distances or the hydrocarbon vapors condensed and separated therefrom, and also that ordinary illuminating-gas does not always hold a sufficient amount of carbon or as much as can be easily imparted thereto and by which its illuminating power would be highly increased. It is also well known that the natural gas, now so largely produced in this country, possesses, as a rule, but little illuminating power when burned in or by means of the ordinary illuminating-burner, this gas being highly deficient in carbon and olefiant gas, and these substances being the best adapted for the production of light during combustion it is essential that the proportions thereof shall be increased in order to obtain the best results in burning natural gas for illuminating purposes.

The object of this invention is to remove the foregoing objections, so common both in artificial and natural gas, and to accomplish the desired specified results in the most effective and economical manner; and the invention consists in the combination of certain substances hereinafter specified, which combination or compound serves as a carbon imparter to the gas, which is made to pass over or in contact therewith, or through substances impregnated therewith in a vessel prepared for that purpose, in the well-known manner.

The accompanying drawing, which is intended to illustrate one method of employing my new carbureting compound, shows in central vertical section a carbureting-vessel provided with the necessary attachments, and the following specification, of which said drawing forms a part, is such a full, clear, and exact description of the invention as will enable those skilled in the art to which it appertains to make, compound, and use the same.

Referring to the drawing, A represents a vessel of any desired construction provided with a gas-inlet B and a gas-outlet C. Arranged as near the top of the vessel as possible are a number of rods D, which extend, preferably, across the vessel, and suspended from these rods are heavy strips of wicking, coarse cloth, cotton wadding or batting or any other substance possessing the necessary capillary powers, which extend downward into the carbureting compound E, as shown, the vessel A being filled therewith, preferably, to about two-thirds of its capacity.

The compound employed by me as a means of carbureting or enriching the gas when brought in contact therewith consists of a combination of the following substances in about the proportions specified, viz: benzole, one gallon; sulphuric ether, two ounces, and bisulphide of carbon two ounces. The benzole employed is preferably that known to the trade as of "85 gravity," and it is evident that the quantities of the various substances given may be varied to some extent without substantially altering the character or efficiency of the compound.

The combination of the above-mentioned substances forms a carbureting fluid possessing in the highest degree carbon and other elements so essential in all gases which are to be burned for the purposes of illumination, and in which artificial gas at times and natural gas always are deficient.

The wicking or other capillary substances suspended from the rods D are constantly saturated with the fluid by reason of the capillary action, and the gas which is admitted on one side of said substances is compelled to pass through the same or around and in close contact therewith and becomes highly saturated with and enriched by the carbonaceous and other light-giving elements contained therein. Not only natural gas and the poorer qualities of ordinary illuminating-gas may thus be highly carbureted and their light-giving qualities increased many fold, but atmospheric air may also be carbureted and rendered available as an illuminant by passing it through a carburetor provided with my improved carbureting compound.

The use of the bisulphide of carbon is not absolutely essential in all cases in the compound herein specified, as excellent results may sometimes be obtained with only the benzole and sulphuric ether, combined as herein described.

The carburetor may be placed at any desired point, preferably between the meter and the burners, and it may be of any desired size or construction, the length of time during which it may be operated without refilling depending upon the size of the carburetor and the number of burners supplied thereby.

Having fully described my invention, what I claim, and desire to secure by Letters Patent, is—

A compound for carbureting gas, air, or other illuminating-fluids, composed of benzole, sulphuric ether, and bisulphide of carbon united, as and for the purposes set forth.

Signed at New York, in the county of New York and State of New York, this 29th day of April, A. D. 1889.

TIMOTHY B. WELLMAN.

Witnesses:
 JAMES C. GATES,
 S. SMITH.